(12) United States Patent
Bouissou

(10) Patent No.: US 6,700,265 B1
(45) Date of Patent: Mar. 2, 2004

(54) EDDY CURRENT RETARDER

(75) Inventor: Stefan Bouissou, Paris (FR)

(73) Assignee: Telma, Saint-Ouen l'Aumone (FR)

( * ) Notice: Subject to any disclaimer, the term of this patent is extended or adjusted under 35 U.S.C. 154(b) by 30 days.

(21) Appl. No.: 09/913,694

(22) PCT Filed: Dec. 20, 2000

(86) PCT No.: PCT/FR00/03612

§ 371 (c)(1),
(2), (4) Date: Sep. 24, 2001

(87) PCT Pub. No.: WO01/47093

PCT Pub. Date: Jun. 28, 2001

(30) Foreign Application Priority Data

Dec. 22, 1999 (FR) .............................. 99 16241

(51) Int. Cl.[7] .............................. H02K 9/02; H02K 9/06
(52) U.S. Cl. ...................... 310/105; 310/106; 310/107
(58) Field of Search ........................ 310/103, 105–109, 310/92–93, 76–77; 188/158, 161, 164, 264 D, 296; 180/197; H02K 49/02, 49/04

(56) References Cited

U.S. PATENT DOCUMENTS

| 2,436,072 A | 2/1948 | Matulaitis ................... 310/105 |
| 3,184,626 A | * 5/1965 | Luenberger ................. 310/105 |
| 3,924,585 A | 12/1975 | Woods ..................... 123/41.12 |
| 4,864,173 A | * 9/1989 | Even .......................... 310/105 |
| 5,873,342 A | 2/1999 | Hans et al. ................. 123/195 |

FOREIGN PATENT DOCUMENTS

| EP | 0 899 858 | 3/1999 | |
| JP | 6-253527 | * 9/1994 | ................ 310/105 |
| JP | 6-327227 | * 11/1994 | ................ 310/105 |
| JP | 92 01037 | 7/1997 | |
| JP | 2002153042 | * 5/2002 | ................ 310/105 |

* cited by examiner

*Primary Examiner*—Tran Nguyen
(74) *Attorney, Agent, or Firm*—Sturm & Fix LLP

(57) ABSTRACT

An eddy current retarder having a rotor part of the retarder with symmetry of revolution about the axis of the engine shaft so that it has a peripheral face facing a peripheral face of the stator part, the inductor of the retarder having at least one electromagnetic winding. Thus, the Eddy current retarder maintains a compact structure while at the same time allowing simple and easy control over its magnetic flux by virtue of the presence of electromagnets.

10 Claims, 2 Drawing Sheets

EDDY CURRENT RETARDER

CROSS-REFERENCE TO RELATED APPLICATIONS

This application is a national phase of PCT/FR00/03612 filed Dec. 20, 2000, claiming priority of French Appln. No. FR 99 16241, filed Dec. 22, 1999, all of which are included in their entirety by reference made hereto.

BACKGROUND OF THE INVENTION

1. Field of the Invention

The present invention relates to an Eddy current retarder for a vehicle, intended to slow the rotation of a shaft driven about its axis.

Among such retarders, the invention relates more especially to those which are intended to slow the rotation of an engine shaft driven about its axis, particularly the crankshaft of a vehicle engine, this engine having a casing which itself comprises a frontal wall stretching substantially in a plane perpendicular to the axis of the crankshaft, which crankshaft has one end which is directed toward the frontal wall of the casing of the engine and in the region of which the retarder is mounted overhangingly on the frontal wall of the casing of the engine via connecting means, the retarder comprising a rotor part which rotates as one coaxially with the crankshaft, a stator part coaxial with the crankshaft and secured to the frontal wall of the casing of the engine, an armature belonging to the rotor part and an inductor belonging to the stator part, the inductor being arranged on a stationary annular component of the stator part, facing the armature.

2. Description of the Prior Art

Document JP9201037 describes an Eddy current retarder of the abovementioned type.

Such a retarder has the advantage of having a simplified structure and a low weight and size, given its geometry with a ferromagnetic central disk rotating as one with the crankshaft and rotating between two disks which support energizing means consisting of permanent magnets projecting axially toward the central disk, it being possible also for one of the two disks with permanent magnets to be rotated by a servomotor.

However, the main disadvantage with this retarder is that its braking torque is difficult to control. This is because two disks are equipped with permanent magnets, the magnetic flux of which is difficult to control. In particular, this retarder does not make it possible to completely cancel the magnetic flux, particularly the magnetic flux tangential to the disks, which remains very high.

Another disadvantage of this retarder lies in the fact that it is arranged between the engine and a pulley that drives the timing and accessories, said pulley being situated at the output of the crankshaft. What this means is that the pulley, thus distanced from the engine, will give rise to a significant overhang of the belt that drives the engine auxiliaries, which belt habitually runs around this pulley, such an overhang entailing moving all the accessories, and therefore creating a similar overhang in said auxiliaries in order to avoid, in the long term, causing this belt running around the pulley to break.

BRIEF SUMMARY OF THE INVENTION

A particular object of the present invention is to overcome these drawbacks.

To this end, the rotor part of the retarder according to the invention has symmetry of revolution about the axis of the crankshaft so that it has a peripheral face facing a peripheral face of the stator part, the inductor of the retarder having at least one electromagnetic winding.

Thus, the Eddy current retarder maintains a compact structure while at the same time allowing simple and easy control over its magnetic flux by virtue of the presence of electromagnets.

In some preferred embodiments of the invention, recourse is had to one and/or other of the following arrangements:

- the rotor part has an external component of substantially cylindrical shape which surrounds the stator part and which constitutes the armature of the retarder, said external component having a radial flange secured to the crankshaft, said flange being pierced with a number of holes;
- the inductor of the retarder is an inductor with poles each surrounded by an induction winding and projecting radially outward on the external face of said annular component of the stator part;
- the poles are secured to a first annulus, while the collection of induction windings constitutes a second annulus of larger diameter than that of the first annulus, said second annulus being assembled coaxially with said first annulus by fitting each pole into a respective induction winding;
- the inductor of the retarder is an inductor with claws and with one single induction winding;
- a first set of claws constitutes a first annulus and a second set of claws constitutes a second annulus with the same diameter as that of the first annulus, said induction winding surrounding a cylindrical component of a diameter smaller than that of the first and second annuli, these being assembled coaxially with said cylindrical component in such a way that each claw of the first set of claws is interspersed between two adjacent claws of the second set of claws;
- the connecting means comprise a framework which has at least one substantially radial flange centered on the crankshaft and pierced with a number of holes, said flange itself having arms which extend from it toward the engine to secure the framework to the frontal wall of the casing of the engine, the electromagnetic retarder being housed in a space delimited by the flange, the fixing arms and the frontal wall of the engine;
- a pulley situated at the output of the crankshaft is arranged between the casing of the engine and the retarder; the flange of the external component advantageously incorporating the pulley, so as to reduce the number of parts in the assembly;
- said induction winding (or windings) is (or are) energized from an electrical source, which is regulated for power, of the vehicle.

Other features and advantages of the invention will become apparent in the course of the following description of one of its embodiments, which are given by way of nonlimiting example with reference to the appended drawings.

BRIEF DESCRIPTION OF THE INVENTION

Figure 1:
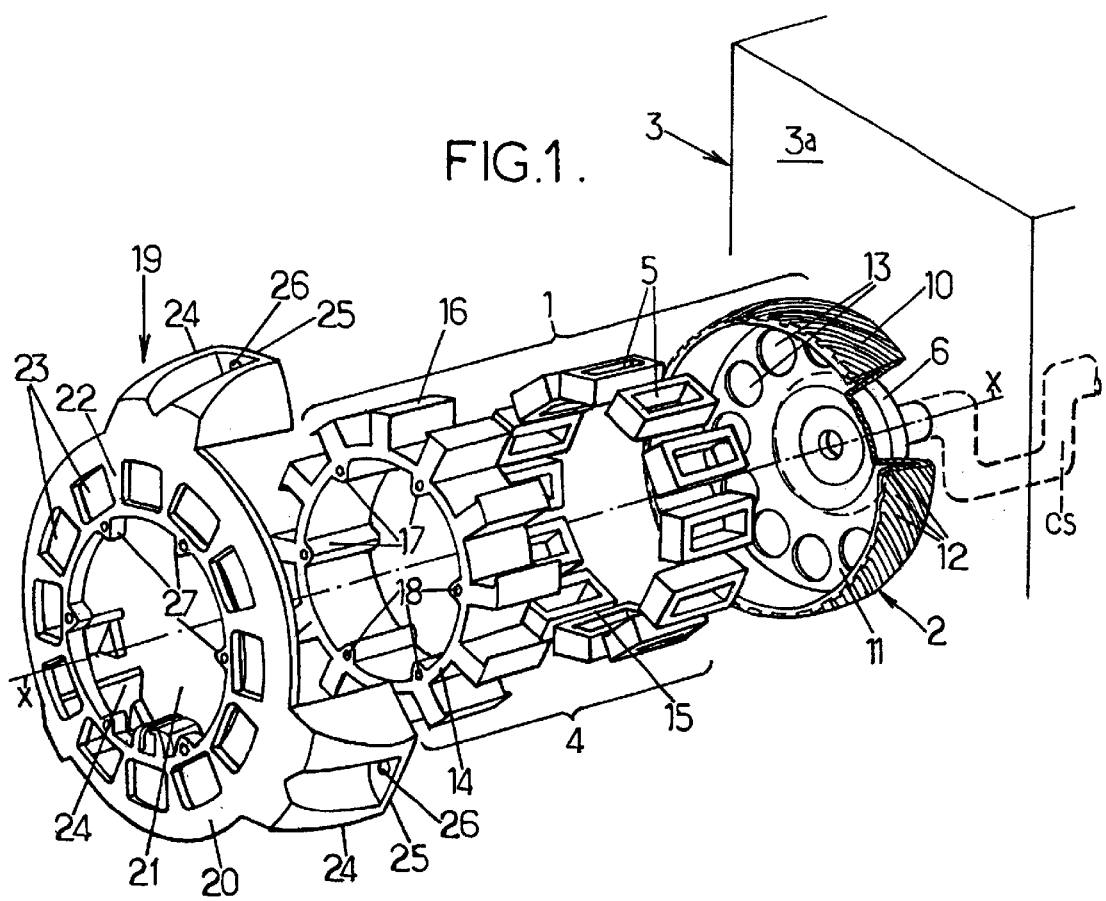
FIG. 1 is an exploded perspective view of the Eddy current retarder according to a first embodiment of the invention, before it is mounted on the casing of the engine.
Figure 2:
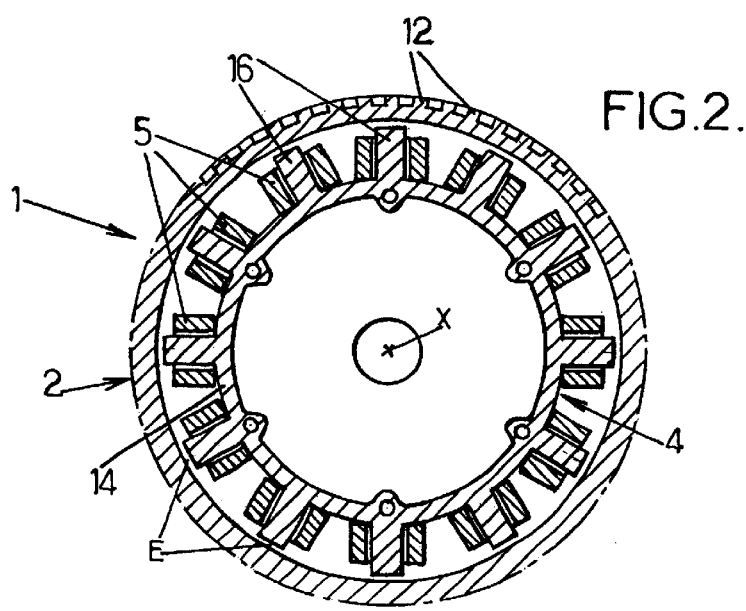
FIG. 2 is a view in cross section of the retarder of FIG. 1, after its rotor and its stator have been assembled.

Referring to FIGS. 1 and 2, a first embodiment of the Eddy current retarder 1 according to the present invention comprises an armature rotor 2 which rotates with a shaft rotated about a substantially horizontal axis X, this shaft consisting, in particular, of the crankshaft cs of a vehicle engine M. This engine comprises a casing 3 which itself has a frontal wall 3a stretching substantially in a plane perpendicular to the axis X of the crankshaft cs. The Eddy current retarder 1 further comprises an inductor stator 4 comprising electromagnetic windings 5 which consist respectively of coils.

Figure 3:
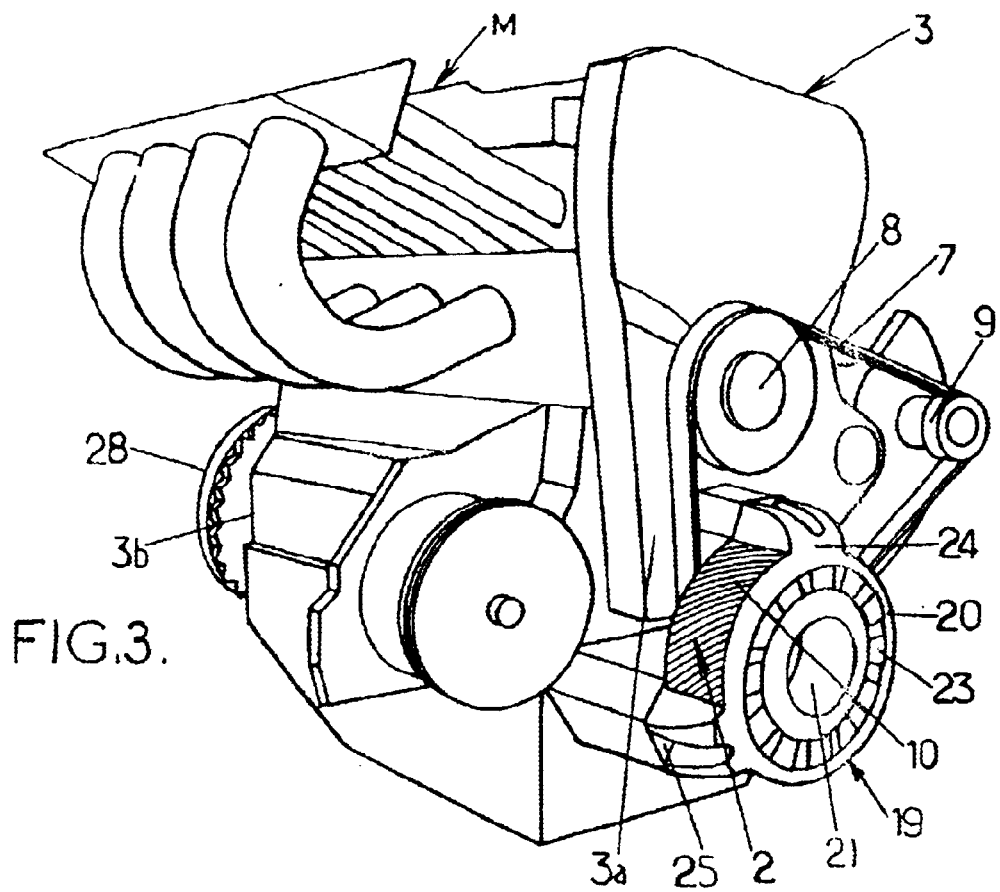
FIG. 3 is a perspective view of the retarder of FIG. 1, depicting the latter in its position mounted on the casing of the engine.

The aforementioned retarder 1 is intended to be arranged at the output of the crankshaft cs, on the same side as the pulley 6, and therefore on the opposite side to the output of the engine shaft that is connected to the gearbox, said retarder being mounted overhangingly on the frontal wall 3a of the casing 3 of the engine M as depicted in FIG. 3. Unlike the arrangement anticipated in the prior art described above, it is contrived for the pulley 6, which conventionally lies at the output of the crankshaft, and which is intended to be surrounded by a belt 7 suitable for driving the engine auxiliaries, such as the camshafts 8 and the alternator 9 in particular, together with the water pump, to be inserted between the retarder 1 and the frontal wall 3a of the casing 3 of the engine M so as to eliminate any problem of aligning the belt 7 with the auxiliaries it drives. This solution proves thus to be far more compact than the one adopted in the prior art described above, because it does not entail compensating for the overhang of the pulley and of the belt by creating an overhang of the auxiliaries it drives.

More specifically, with reference to FIGS. 1 and 2, the rotor 2 has an external component which is substantially cylindrical of revolution about the axis X and which has a circular cross section. This component is hollow so that it surrounds the stator 4. It has an envelope 10 and an end wall 11 forming a flange, the assembly being made of a ferromagnetic material, generally of steel, and equipped, on the outside of the envelope 10, with ribs 12, for example helical ribs, formed integrally with the envelope 10 and which are intended to act as radiator fins to cool the rotor 2 heated by the Eddy currents. These ribs 12 are also capable, if they have a suitable profile, of causing the rotor 2 to act like a fan, sweeping a stream of cooling air over the hot surfaces of the rotor 2 that need to be cooled, when the retarder is in use. The rotor 2 is arranged coaxially with the axis X of the crankshaft cs, the flange 11 being fixed to the crankshaft cs by means of an axial screw which passes through the flange 11 and is fixed into the end facing it of the crankshaft cs. The flange 11 has a peripheral rim which is pierced with a number of holes 13, for example circular ones, the usefulness of which will be seen later on in the description. In addition, the flange 11 may incorporate the pulley 6, these two elements then being produced as a single piece with the rest of the armature rotor 2.

In the example depicted, the stator 4 comprises two annuli 14 and each of which has a substantially annular shape. Polar cores 16 project from the external peripheral surface of the annular 14, in a radial direction with respect to the latter. Said polar cores, of which there are twelve in the example depicted, but of which there may be any number, are uniformly distributed about the annulus 14, each polar core stretching parallel to the axis X of the crankshaft cs. The annulus 15 for its part consists of a succession of twelve electromagnetic coils 5 close together so that they substantially define a circle centered on the axis X of the crankshaft cs. The annulus 15 has a diameter slightly greater than that of the annulus 14 so that it can be assembled coaxially with the annulus 14 by fitting each polar core 16 into a respective coil 5.

The various electromagnetic coils 5 are connected to a source of direct current, such as, for preference, the battery (not depicted) of the vehicle, via appropriate control and regulating devices (not depicted).

When the retarder is powered, an electric current runs through the electromagnetic coils 5 and these generate Eddy currents in the rotor 2 which thus passes in front of the polar cores 16 which are alternately positive and negative. This results in a torque which slows the crankshaft cs and heats the rotor 2, which heating is partially compensated for by the ventilation afforded by the ribs 12.

Such a mounting of the stator 4 therefore advantageously allows the magnetic flux to be controlled in a simpler and quicker way than in the retarder described in the prior art mentioned hereinabove. It is thus possible to completely cancel this flux by cutting off the current delivered by the battery.

It is contrived for the inductor stator assembly consisting of the assembly of the two annuli 14 and 15 to have a diameter and an axial length which are slightly smaller than those of the rotor 2, so that when the retarder 1 is being assembled, this assembly is introduced into the external component of the rotor 2, a small (for example with a thickness E of 1 to 3 mm) gap being left between the internal surface of the envelope 10 of the rotor 2 and the corresponding polar cores 16 of the annulus 14 of the stator 4. Such an arrangement thus makes it possible for the external component of the rotor 2 to travel past the polar cores 16 of the stator 4.

It should incidentally be noted that the hollow cylindrical shape of the retarder 1 according to the present invention makes it incontestably lighter and less expensive than the disk-type retarder of the prior art described hereinabove.

Still with reference to FIGS. 1 and 2, the annulus 14 of the stator 4 is equipped, on its interior periphery, with bosses 17 which extend in the direction of the axis X of the crankshaft cs. In the example depicted, there are six of these bosses and they are arranged in the continuation of a first, third, fifth, seventh, ninth and eleventh successive polar core 16. Each of the bosses 17 is pierced with a tapped axial bore 18, intended to take a screw (not depicted) for securing the annulus 14 of the stator 4 to a framework 19. This framework is itself intended to be secured to the frontal wall 3a of the casing 3 of the engine M of the vehicle, as is depicted in FIG. 3.

The framework 19 is a rigid component which can be made, for example, of cast iron and aluminum alloy. This component comprises a flange 20 which has a substantially annular shape and is arranged in a more or less radial plane coaxial with the axis X of the crankshaft cs. The flange 20 has a central opening 21 to lighten it. It also comprises a peripheral part 22 which is pierced with a number of holes 23, for example rectangular ones, the utility of which will be seen later on in the description. The framework 19 also comprises arms 24 which each stretch axially in the direction of the axis X of the crankshaft cs, from the outer edge of the peripheral part 22 of the flange 20. Each arm 24 has a base 25 pierced with a hole 26 which is designed to take a screw (not depicted) so that the framework 19 can be secured to the frontal wall 3a of the casing 3 of the engine M, as is depicted in FIG. 3. In the example depicted, there are three arms 24 and they are distributed at uniform spacings of 120° about the flange 20. The internal edge of the peripheral part 22 of the flange 20 is, for its part, provided with securing parts 27 each of which comprises a tapped hole. These securing parts 27 are six in number and are distributed at uniform intervals around said internal edge. They are also arranged in such a way that when the retarder 1 is mounted on the framework 19, they come respectively into register with the bosses 17 of the annulus 14 of the stator 4 so that the screws, associated respectively with the bosses 17, can be screwed into the tapped holes of the securing parts 27, this being so as to secure the annulus 14 of the stator 4 to the framework 19.

Furthermore, it is contrived for, on the one hand, the flange 20 to have an outside diameter slightly greater than that of the envelope 10 of the rotor 2 and, on the other hand, for the securing arms 24 to have a length which is slightly greater than the axial length of the rotor 2, so that in the mounted position on the frontal wall 3a of the casing 3 of the engine M, the retarder 1 is housed entirely between the flange 20 of the framework the arms 24 thereof and the frontal wall 3a of the casing 3 of the engine M, as can be seen in FIG. 3.

Such a configuration of the framework 19 and of the retarder 1 thus makes it possible to produce a compact assembly of the retarder 1 on the casing 3 of the engine M. Furthermore, the rotor 2 has the advantage, given its shape and arrangement, that it can act as a flywheel, supplementing the flywheel 28 as depicted in FIG. 3, which is arranged against the rear wall 3b of the casing 3 of the engine M.

This assembly also has the advantage of being particularly light in weight, not only because of the hollow cylindrical geometry of the assembly consisting of the framework 19 and of the retarder 1, but also because of the presence of the holes 13 and 23 made respectively in the flange 11 of the rotor 2 and in the flange 20 of the framework 19. It should be noted that the holes 13 and 23 also have a function of allowing cooling air to circulate in the direction of the stator 4 so as to reduce the heating of the electromagnetic coils 5. Furthermore, the collection of holes 13 forms a thermal barrier which prevents the heat energy dissipated by the retarder 1 from propagating by conduction in the direction of the pulley 6.

An alternative form of the stator 4 of the retarder 1 of the invention will now be described with reference to FIG. 4.

In this second embodiment, the retarder 1 comprises, as in the first embodiment described hereinabove, a rotor 2 which is in every respect identical to the rotor depicted in FIGS. 1 and 2 and which, for this reason, is neither described in detail nor depicted. The retarder 1 of FIG. 4 can be distinguished from that of FIGS. 1 and 2 only in that it has a stator 4' made in three parts rather than two.

More specifically, this stator 4' comprises a component 4'a which is substantially cylindrical of revolution about the axis X and of circular cross section. The cylindrical component 4'a comprises an envelope surrounded by a conducting wire 5' which is wound in such a way as to form several successive turns 5'a of circular cross section. In a way known per se, the collection of these turns of wire 5'a constitutes the induction winding of the retarder 1. In the same way as the various electromagnetic coils 5 of the first embodiment depicted in FIGS. 1 and 2, the turns 5'a wound around the cylindrical component 4'a are connected to a source of direct current such as, for preference, the battery (not depicted) of the vehicle.

Figure 4:
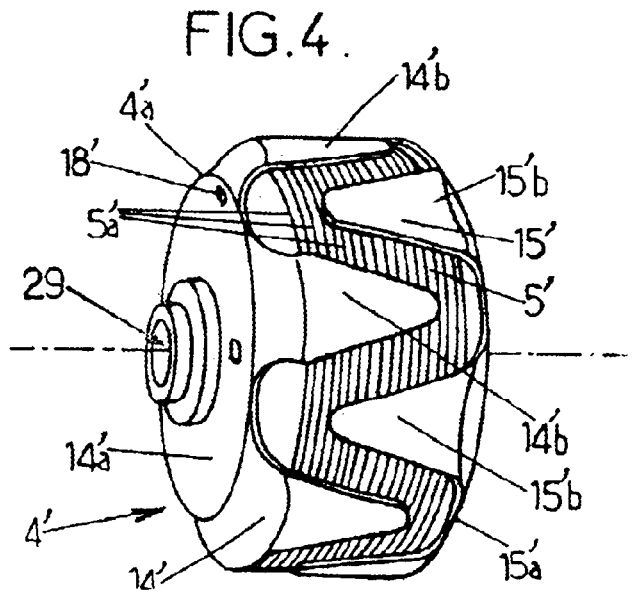
FIG. 4 is a schematic exploded perspective view of an alternative form of the stator of the retarder of FIGS. 1 and 2.

In the example depicted in FIG. 4, the stator 4' further comprises two annuli 14' and 15' each of which has a substantially annular shape. These annuli are in every respect identical and consist respectively of a radial flange 14'a or 15'a pierced with a coaxial central hole 29 and with a succession of claws 14'b, 15'b which, in the example depicted, have a substantially triangular shape. The claws 14'b and 15'b are distributed at regular intervals about their respective annulus, each claw 14'b, 15'b stretching in the direction of an axis parallel to the axis X of the crankshaft, from the peripheral edge of the flange 14'a, 15'a associated with it. The annuli 14' and 15' have a diameter slightly greater than that of the cylindrical component 4'a so as to be assembled on the latter, said annuli 14' and 15' then being arranged coaxially with the cylindrical component 4'a. The axial length of the annuli 14' and 15' is determined in such a way that they, between them, substantially completely surround the cylindrical component 4'a, each claw 14'b of the annulus 14' being interspersed between two adjacent claws 15'b of the annulus 15'.

As mentioned previously in the context of the first embodiment of the retarder 1 depicted in FIGS. 1 and 2, it is contrived for the assembly consisting of the assembly of the two annuli 14' and 15' on the cylindrical component 4'a to have a diameter and an axial length which are slightly smaller than those of the rotor 2, so that when the retarder is mounted, this assembly is completely introduced into the external component of the rotor 2, a small (for example 1 to 3 mm wide) gap being left between the internal surface of the envelope 10 of the rotor 2 and the corresponding claws 14'b and 15'b of the stator 4', which thus makes it possible for the external component of the rotor 2 to travel past the claws 14'b and 15'b of the stator.

The way in which the retarder equipped with the stator 4' works is similar to the operation of the retarder according to the first embodiment described hereinabove. What this means is that when the retarder according to the second embodiment is powered, an electric current passes through the collection of turns 5'a and generates Eddy currents in the rotor 2 which then travels past the claws 14'b and 15'b of the stator 4' which are alternately positive and negative. This results in a torque which slows the crankshaft cs.

In a similar way to the stator 4 as illustrated in FIG. 1, the annulus 14' of the stator 4' is pierced with peripheral holes 18' each of which is intended to take a screw (not depicted) so that said annulus 14' can be secured to the framework 19.

What is claimed is:

1. Eddy current electromagnetic retarder for reducing rotation of a crankshaft of a vehicle engine driven about an axis, said engine having a casing wherein said casing comprises a frontal wall stretching substantially in a plane perpendicular to said axis of said crankshaft, said crankshaft has one end directed toward said frontal wall of said casing of said engine, the retarder being mounted overhangingly on said frontal wall of said casing of said engine via connecting means, the retarder comprising a rotor part which rotates coaxially with said crankshaft, a stator part coaxial with said crankshaft and secured to said frontal wall of said casing of said engine, an armature operatively attached to said rotor part and an inductor operatively attached to said stator part, said inductor being arranged on a stationary annular component of said stator part, facing said armature, wherein said rotor part has symmetry of revolution about said axis of said crankshaft so that said rotor part has a peripheral face facing a peripheral face of said stator part, said inductor of said retarder having at least one electromagnetic winding.

2. The retarder as claimed in claim 1, wherein said rotor part has an external component of substantially cylindrical shape which surrounds said stator part and which constitutes said armature of said retarder, said external component having a radial flange secured to said crankshaft, said flange being pierced with a number of holes.

3. The retarder as claimed in either of claims 1 and 2, wherein said inductor of said retarder is an inductor with poles each surrounded by an induction winding and projecting radially outwardly on an external face of said annular component of said stator part.

4. The retarder as claimed in claim 3, wherein said poles are secured to a first annulus and the collection of induction windings constitutes a second annulus of larger diameter than that of said first annulus, said second annulus being assembled coaxially with said first annulus by fitting each pole into a respective induction winding.

5. The retarder as claimed in either of claims 1 and 2, wherein said inductor of said retarder is an inductor with claws and with one single induction winding.

6. The retarder as claimed in claim 5, wherein a first set of claws constitutes a first annulus and a second set of claws constitutes a second annulus with the same diameter as that of the first annulus, said induction winding surrounding a cylindrical component of a diameter smaller than that of the first and second annuli, said annuli being assembled coaxially with said cylindrical component in such a way that each claw of the first set of claws is interspersed between two adjacent claws of the second set of claws.

7. The retarder as claimed in either of claims 1 and 2, wherein said connecting means comprise a framework which has at least one substantially radial flange centered on said crankshaft and pierced with a number of holes, said flange having arms extending from said flange toward said engine to secure said framework to said frontal wall of said casing of said engine, the electromagnetic retarder being housed in a space delimited by said flange, said fixing arms and said frontal wall of said engine.

8. The retarder as claimed in either of claims 1 and 2, wherein a pulley situated at an output of said crankshaft is arranged between said casing of said engine and the retarder.

9. The retarder as claimed in claim 1, wherein said rotor part has an external component of substantially cylindrical shape surrounding said stator part and constituting said armature of the retarder, said external component having a radial flange secured to said crankshft, wherein said flange being pierced with a number of holes; said retarder further comprises a pulley being situated at an output of said crankshaft and arranged between said casing of said vehicle engine and said retarder, wherein said flange of said external component incorporates the pulley.

10. The retarder as claimed in either of claims 1 and 2, wherein said induction winding is energized from an electrical source, which is regulated for power, of the vehicle.

* * * * *